F. B. EILERS.
DISPENSING FAUCET.
APPLICATION FILED AUG. 8, 1918.

1,348,854.

Patented Aug. 10, 1920.

INVENTOR.
Frank B. Eilers
BY
Walter A. Knight
ATTORNEY.

UNITED STATES PATENT OFFICE.

FRANK B. EILERS, OF FORT WAYNE, INDIANA, ASSIGNOR TO WAYNE OIL TANK & PUMP COMPANY, OF FORT WAYNE, INDIANA, A CORPORATION OF INDIANA.

DISPENSING-FAUCET.

1,348,854.  Specification of Letters Patent.  Patented Aug. 10, 1920.

Application filed August 8, 1918. Serial No. 248,909.

*To all whom it may concern:*

Be it known that I, FRANK B. EILERS, a citizen of the United States, residing at Fort Wayne, in the county of Allen and State of Indiana, have invented new and useful Improvements in Dispensing-Faucets, of which the following is a specification.

My invention relates to valves of the type generally known as "packless" valves, which have no external stuffing box containing compressible packing material to prevent leakage around the valve stem. Such valves are especially valuable for handling gasolene and other volatile fluids when properly designed and constructed to dispense gasolene for automobile use in accurately measured quantities, in connection with suitable dispensing apparatus. My invention is an improvement with respect to means for insuring a proper spring-action upon the packing of the valve-rotating element within the body casing of the structure, said element operating in a fixed plane of rotation, but telescopically in relation to the valve which it rotates, causing the valve to rise and fall in relation to its seat by interengaging threads of the valve and guide element, with and by which the vertical movement of the valve is effected as a result of its rotation.

The particular embodiment of my invention herein illustrated is in a faucet of approved construction for gasolene or other volatile fluids. In the accompanying drawings of same:—

Figure 1:
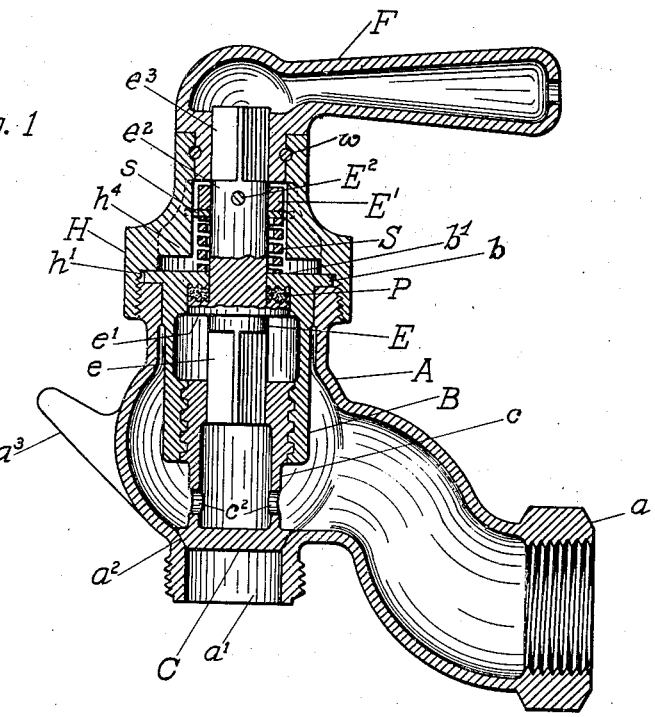
Figure 2:
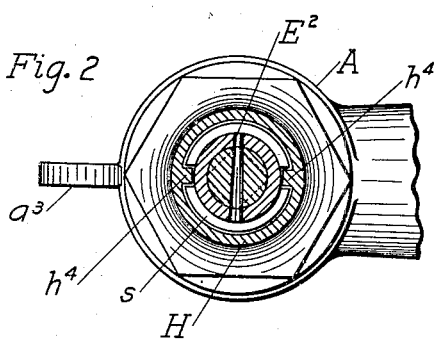
Figure 3:
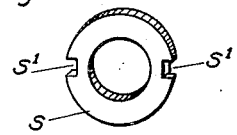

Figure 1 is a vertical, axial section of the faucet embodying my improvement;

Fig. 2 a horizontal cross section in the axial plane of the connecting pin of the abutment collar; and Fig. 3 a perspective view of the friction plate detached.

Referring now to the drawings, A is the valve-body of the faucet, having a receiving orifice $a$, and a discharge outlet $a^1$. Within the outlet the body is suitably shaped to form a seat $a^2$ for the valve C, and externally attached is a hook $a^3$ for a bucket-bail as is usual.

The valve C has a cylindrical upward extension $c$ externally threaded to engage upon corresponding internal threads of a tubular guide-element B secured within the body A of the faucet by a close fit within the cylindrical wall of the casing and a peripheral flange $b$ extending outwardly and resting upon the upper edge of the said wall, where it is clamped in fixed position by the bonnet H which is provided with an inner shoulder $h^1$ for the purpose. The flange is extended also inwardly as at $b^1$ to form a guide for the rotating stud E.

The upper inner portion of the valve extension $c$ is squared to form a telescopic fit with the squared lower portion $e$ of the rotating stud E, which is similarly squared at its upper portion $e^3$ to engage the operating handle F. Radial holes $c^2$ in the valve extension $c$ allow the liquid whose flow is controlled by the valve to pass freely into and through the interior of the valve extension $c$ as it is raised or lowered in relation to stud E.

Between its squared ends $e$ and $e^3$ the rotating stud has a cylindrical portion $e^2$, near the lower portion of which is a peripheral flange $e^1$, which carries at its upper side a packing ring P which is held in compression upwardly against the inwardly extending flange $b^1$ of the tubular guide-element B by a spring as presently described.

Connecting with the casing part A, is the removable cover or "bonnet" H, interiorly threaded upon the body A near the top of the latter, so that when the bonnet H is screwed down on the body, the valve guide B is securely clamped in position accurately centered as indicated.

A collar $E^1$ is held fixedly upon the stud E in any suitable manner (as by the pin $E^2$). The collar $E^1$ thus secured, is the means through which the rotating stud E is upheld by spring pressure and its flange $e^1$ maintained with compressive force against the packing ring P to maintain a leak-tight packing at the guide orifice of the annular flange $b^1$ occupied by the rotating stud E. In the usual construction of such faucets where packing is required under similar conditions, a coiled spring S is introduced seating downwardly upon a non-rotating surface, such for example, as that of the guide element B in the present illustration, and bearing upwardly against the collar $E^1$ which rotates with the stud E. This construction however, is defective in practice, as it brings a torsional strain upon the spring and continual wear upon the contact surfaces of the spring and abutments that leads to inefficient action and breakage.

This defect in faucets of this class is vital; and my improvement furnishes a complete remedy. To this end I form the bonnet H with internal ribs $h^4$ at opposite positions upon the inner wall projecting inwardly with parallel vertical edge, and place upon the stud E just beneath the collar $E^1$, a friction washer S having opposite guide sockets $s^1$ formed to engage upon the opposite guide ribs $h^4$. It will be seen that thus-equipped the spring bears at both ends upon non-rotating surfaces, independently of the rotation of the stud E; and all torsional strain and seating wear is rendered non-existent. The life of the spring is thus prolonged indefinitely, and the perfect action of the spring in maintenance of compression prolongs the perfect action of the packing.

I claim and desire to secure by Letters Patent of the United States, as follows:

In a dispensing faucet, the combination with a valve body, a bonnet fitted to the upper end thereof, a rotatable reciprocating valve seating on said body and having an upper extension, a tubular guide element for the valve, said element having a closed top pierced at its center, and a valve stem passing through the top of said guide element and engaging the extension of said valve, said stem having a fixed flange and a fixed collar, of a coiled spring surrounding said stem and seating below on the top of the guide element, a packing between the under side of the top of the guide element and said fixed flange, and a non-rotating friction washer on the stem between the top of the spring and the fixed collar, said washer having slots in its sides and said bonnet having guide ribs on its inner surface engaged by the slots of the washer.

In testimony whereof I have hereunto set my hand in presence of two subscribing witnesses.

FRANK B. EILERS.

Witnesses:
LAWRENCE H. PARROT,
CLARA BICKEL.